US009367847B2

(12) United States Patent
Priyadarshan et al.

(10) Patent No.: US 9,367,847 B2
(45) Date of Patent: Jun. 14, 2016

(54) PRESENTING CONTENT PACKAGES BASED ON AUDIENCE RETARGETING

(75) Inventors: Eswar Priyadarshan, West Roxbury, MA (US); Kenley Sun, Cambridge, MA (US); Dan Marius Grigorovici, Pleasanton, CA (US); Ravikiran Chittari, Acton, MA (US); Jayasurya Vadrevu, Lexington, MA (US); Prasenjit Mukherjee, Bangalore (IN)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 12/789,851

(22) Filed: May 28, 2010

(65) Prior Publication Data

US 2011/0295997 A1 Dec. 1, 2011

(51) Int. Cl.
*G06F 15/173* (2006.01)
*G06Q 30/00* (2012.01)

(52) U.S. Cl.
CPC .................................... *G06Q 30/00* (2013.01)

(58) Field of Classification Search
CPC .......... G06Q 30/0251; G06Q 30/0242; G06Q 30/02; G06Q 30/0241; G06Q 30/0257; H04L 29/08756; H04L 29/08783; H04N 21/25891; G06F 17/30905
USPC ......... 705/10, 14, 14.66, 14.45, 14.53, 14.41, 705/14.49, 14.42, 14.55; 709/203; 463/1; 706/52; 725/62, 116
See application file for complete search history.

(56) References Cited

U.S. PATENT DOCUMENTS

| | | | |
|---|---|---|---|
| 5,408,519 | A | 4/1995 | Pierce et al. |
| 5,613,213 | A | 3/1997 | Naddell et al. |
| 5,640,590 | A | 6/1997 | Luther |

(Continued)

FOREIGN PATENT DOCUMENTS

| | | |
|---|---|---|
| BE | 1015704 | 7/2005 |
| DE | 19941461 | 3/2001 |

(Continued)

OTHER PUBLICATIONS

"Baugher et al", The Secure Real-Time Transport Protocol (SRTP), Mar. 2004, Network Working Group Request for Comments:3711, p. 1-53.

(Continued)

*Primary Examiner* — Dustin Nguyen
(74) *Attorney, Agent, or Firm* — Polsinelli LLP

(57) ABSTRACT

A present technology intelligently retargets invitational content to a user by maintaining a user profile that includes data descriptive of the user's interaction with invitational content previously presented to the user and making decisions regarding retargeting based on an analysis of the user profile. The information in the user profile is not limited to whether or not the user completed a conversion action associated with invitational content presented. Rather, the profile is expanded to include such information as where on the conversion continuum the user abandoned the process and details of how the invitational content was presented to the user, e.g. colors used, situation, and message. When presented with a request for invitational content, the system uses the profile information to influence which content is selected and how it is presented to the user. This enables the system to re-present invitational content in a form and/or situation where the user is more likely to complete the conversion action.

26 Claims, 5 Drawing Sheets

(56) References Cited

U.S. PATENT DOCUMENTS

| | | | |
|---|---|---|---|
| 5,697,844 | A | 12/1997 | Von Kohorn |
| 5,892,451 | A | 4/1999 | May |
| 5,978,775 | A | 11/1999 | Chen |
| 5,978,833 | A | 11/1999 | Pashley et al. |
| 6,009,458 | A | 12/1999 | Hawkins |
| 6,023,700 | A | 2/2000 | Owens et al. |
| 6,038,591 | A | 3/2000 | Wolfe |
| 6,043,818 | A | 3/2000 | Nakano |
| 6,097,942 | A | 8/2000 | Laiho |
| 6,205,432 | B1 | 3/2001 | Gabbard |
| 6,212,545 | B1 | 4/2001 | Ohtani et al. |
| 6,222,925 | B1 | 4/2001 | Shiels et al. |
| 6,269,361 | B1 | 7/2001 | Davis et al. |
| 6,286,005 | B1 * | 9/2001 | Cannon ...................... 705/14.66 |
| 6,334,145 | B1 | 12/2001 | Adams et al. |
| 6,338,044 | B1 | 1/2002 | Cook et al. |
| 6,345,279 | B1 | 2/2002 | Li et al. |
| 6,381,465 | B1 | 4/2002 | Chern et al. |
| 6,389,278 | B1 | 5/2002 | Singh |
| 6,405,243 | B1 | 6/2002 | Nielsen |
| 6,408,309 | B1 | 6/2002 | Agarwal |
| 6,438,557 | B1 | 8/2002 | Dent |
| 6,516,416 | B2 | 2/2003 | Gregg et al. |
| 6,628,247 | B2 | 9/2003 | Toffolo |
| 6,633,318 | B1 | 10/2003 | Kim et al. |
| 6,646,657 | B1 | 11/2003 | Rouser |
| 6,684,249 | B1 | 1/2004 | Frerichs et al. |
| 6,718,551 | B1 | 4/2004 | Swix et al. |
| 6,816,724 | B1 | 11/2004 | Asikainen |
| 6,826,572 | B2 | 11/2004 | Colace et al. |
| 6,920,326 | B2 | 7/2005 | Agarwal et al. |
| 7,031,932 | B1 * | 4/2006 | Lipsky et al. .............. 705/14.41 |
| 7,035,812 | B2 | 4/2006 | Meisel et al. |
| 7,058,696 | B1 | 6/2006 | Phillips et al. |
| 7,072,947 | B1 | 7/2006 | Knox et al. |
| 7,136,903 | B1 | 11/2006 | Phillips et al. |
| 7,149,537 | B1 | 12/2006 | Kupsh et al. |
| 7,174,309 | B2 | 2/2007 | Niwa |
| 7,181,415 | B2 | 2/2007 | Blaser et al. |
| 7,188,085 | B2 | 3/2007 | Pelletier |
| 7,222,105 | B1 | 5/2007 | Romansky |
| 7,225,342 | B2 | 5/2007 | Takao |
| 7,296,158 | B2 | 11/2007 | Staddon et al. |
| 7,328,343 | B2 | 2/2008 | Caronni |
| 7,360,084 | B1 | 4/2008 | Hardjono |
| 7,383,329 | B2 | 6/2008 | Erickson |
| 7,383,586 | B2 | 6/2008 | Cross et al. |
| 7,455,590 | B2 | 11/2008 | Hansen et al. |
| 7,457,946 | B2 | 11/2008 | Hind |
| 7,492,371 | B2 | 2/2009 | Jeffrey |
| 7,558,559 | B2 | 7/2009 | Alston |
| 7,581,101 | B2 | 8/2009 | Ahtisaari |
| 7,690,026 | B2 | 3/2010 | Zhu et al. |
| 7,882,543 | B2 | 2/2011 | Mousseau |
| 7,945,660 | B2 | 5/2011 | Goyal et al. |
| 8,239,889 | B2 | 8/2012 | Wong et al. |
| 8,346,709 | B2 * | 1/2013 | Silverman et al. .............. 706/52 |
| 8,459,551 | B2 | 6/2013 | Lee et al. |
| 8,577,732 | B1 | 11/2013 | Martin et al. |
| 8,650,081 | B2 | 2/2014 | Basel et al. |
| 8,671,016 | B2 * | 3/2014 | Little ......................... 705/14.49 |
| 8,782,691 | B1 * | 7/2014 | Noble .............. H04N 21/25891 725/116 |
| 2001/0042017 | A1 | 11/2001 | Matsukawa |
| 2001/0047272 | A1 | 11/2001 | Frietas et al. |
| 2001/0051925 | A1 | 12/2001 | Kang |
| 2002/0002510 | A1 | 1/2002 | Sharp et al. |
| 2002/0004413 | A1 | 1/2002 | Nobuhiro |
| 2002/0004743 | A1 | 1/2002 | Kutaragi |
| 2002/0006803 | A1 | 1/2002 | Mendiola et al. |
| 2002/0016736 | A1 | 2/2002 | Cannon et al. |
| 2002/0019829 | A1 | 2/2002 | Shapiro |
| 2002/0052754 | A1 | 5/2002 | Joyce et al. |
| 2002/0059379 | A1 | 5/2002 | Harvey et al. |
| 2002/0061743 | A1 | 5/2002 | Hutcheson |
| 2002/0065720 | A1 | 5/2002 | Carswell et al. |
| 2002/0073210 | A1 | 6/2002 | Low et al. |
| 2002/0075305 | A1 | 6/2002 | Beaton et al. |
| 2002/0077130 | A1 | 6/2002 | Owensby |
| 2002/0078006 | A1 | 6/2002 | Shteyn |
| 2002/0082923 | A1 * | 6/2002 | Merriman et al. .............. 705/14 |
| 2002/0083411 | A1 | 6/2002 | Bouthers et al. |
| 2002/0095330 | A1 | 7/2002 | Berkowitz et al. |
| 2002/0111177 | A1 | 8/2002 | Castres et al. |
| 2002/0116258 | A1 * | 8/2002 | Stamatelatos et al. .......... 705/14 |
| 2002/0128029 | A1 | 9/2002 | Nishikawa |
| 2002/0137507 | A1 | 9/2002 | Winkler |
| 2002/0138291 | A1 | 9/2002 | Vaidyanathan et al. |
| 2002/0141403 | A1 | 10/2002 | Akahane et al. |
| 2002/0164962 | A1 | 11/2002 | Mankins |
| 2002/0174430 | A1 | 11/2002 | Ellis et al. |
| 2002/0183045 | A1 | 12/2002 | Emmerson et al. |
| 2003/0003929 | A1 | 1/2003 | Himmel et al. |
| 2003/0003935 | A1 | 1/2003 | Vesikivi et al. |
| 2003/0037068 | A1 | 2/2003 | Thomas et al. |
| 2003/0040297 | A1 | 2/2003 | Pecen et al. |
| 2003/0040300 | A1 | 2/2003 | Bodic et al. |
| 2003/0064757 | A1 | 4/2003 | Yamadera et al. |
| 2003/0083108 | A1 | 5/2003 | King et al. |
| 2003/0101126 | A1 | 5/2003 | Cheung et al. |
| 2003/0126015 | A1 | 7/2003 | Chan et al. |
| 2003/0130887 | A1 * | 7/2003 | Nathaniel ....................... 705/14 |
| 2003/0144022 | A1 | 7/2003 | Hatch |
| 2003/0154300 | A1 | 8/2003 | Mostafa |
| 2003/0163369 | A1 | 8/2003 | Arr |
| 2003/0182567 | A1 | 9/2003 | Barton et al. |
| 2003/0185356 | A1 | 10/2003 | Katz |
| 2003/0188017 | A1 | 10/2003 | Nomura |
| 2003/0191689 | A1 | 10/2003 | Bosarge et al. |
| 2003/0195039 | A1 | 10/2003 | Orr |
| 2003/0197719 | A1 | 10/2003 | Lincke et al. |
| 2003/0203731 | A1 | 10/2003 | King |
| 2003/0220866 | A1 | 11/2003 | Pisaris-Henderson et al. |
| 2004/0003398 | A1 | 1/2004 | Donian et al. |
| 2004/0032393 | A1 | 2/2004 | Brandenberg |
| 2004/0032434 | A1 | 2/2004 | Pinsky et al. |
| 2004/0043777 | A1 | 3/2004 | Brouwer et al. |
| 2004/0043790 | A1 | 3/2004 | Ben-David |
| 2004/0045029 | A1 | 3/2004 | Matsuura |
| 2004/0045030 | A1 | 3/2004 | Reynolds |
| 2004/0054576 | A1 | 3/2004 | Kanerva et al. |
| 2004/0063449 | A1 | 4/2004 | Fostick |
| 2004/0068460 | A1 | 4/2004 | Feeley |
| 2004/0092248 | A1 | 5/2004 | Kelkar et al. |
| 2004/0093289 | A1 | 5/2004 | Bodin |
| 2004/0136358 | A1 | 7/2004 | Hind et al. |
| 2004/0137987 | A1 | 7/2004 | Nguyen et al. |
| 2004/0143667 | A1 | 7/2004 | Jerome |
| 2004/0152518 | A1 | 8/2004 | Kugo |
| 2004/0185883 | A1 | 9/2004 | Rukman |
| 2004/0186789 | A1 | 9/2004 | Nakashima |
| 2004/0192359 | A1 | 9/2004 | McRaild et al. |
| 2004/0198403 | A1 | 10/2004 | Pedersen et al. |
| 2004/0203761 | A1 | 10/2004 | Baba et al. |
| 2004/0203851 | A1 | 10/2004 | Vetro et al. |
| 2004/0204133 | A1 | 10/2004 | Andrew et al. |
| 2004/0204145 | A1 | 10/2004 | Shoichi |
| 2004/0209649 | A1 | 10/2004 | Lord |
| 2004/0215793 | A1 | 10/2004 | Ryan et al. |
| 2004/0233224 | A1 | 11/2004 | Akio |
| 2004/0240649 | A1 | 12/2004 | Goel |
| 2004/0240861 | A1 | 12/2004 | Yeend et al. |
| 2004/0259526 | A1 | 12/2004 | Goris et al. |
| 2005/0010641 | A1 | 1/2005 | Staack |
| 2005/0018853 | A1 | 1/2005 | Lain et al. |
| 2005/0021395 | A1 | 1/2005 | Luu |
| 2005/0021397 | A1 * | 1/2005 | Cui et al. ........................ 705/14 |
| 2005/0033700 | A1 | 2/2005 | Vogler |
| 2005/0050208 | A1 | 3/2005 | Chatani |
| 2005/0060425 | A1 | 3/2005 | Yeh et al. |
| 2005/0086105 | A1 * | 4/2005 | McFadden et al. ............ 705/14 |
| 2005/0086697 | A1 | 4/2005 | Haseltine |
| 2005/0091381 | A1 | 4/2005 | Sunder |
| 2005/0119936 | A1 | 6/2005 | Buchanan |

(56) References Cited

U.S. PATENT DOCUMENTS

| | | | | |
|---|---|---|---|---|
| 2005/0125397 | A1 | 6/2005 | Gross et al. | |
| 2005/0138369 | A1 | 6/2005 | Lebovitz | |
| 2005/0216341 | A1 | 9/2005 | Agarwal | |
| 2005/0228680 | A1 | 10/2005 | Malik | |
| 2005/0239504 | A1 | 10/2005 | Ishii et al. | |
| 2005/0249216 | A1 | 11/2005 | Jones | |
| 2005/0273465 | A1 | 12/2005 | Kimura | |
| 2005/0289113 | A1 | 12/2005 | Bookstaff | |
| 2006/0031164 | A1 | 2/2006 | Jea-Un | |
| 2006/0031327 | A1 | 2/2006 | Kredo | |
| 2006/0037039 | A1 | 2/2006 | Aaltonen | |
| 2006/0048059 | A1 | 3/2006 | Etkin | |
| 2006/0059044 | A1 | 3/2006 | Chan | |
| 2006/0059495 | A1 | 3/2006 | Spector | |
| 2006/0068845 | A1 | 3/2006 | Muller et al. | |
| 2006/0075019 | A1* | 4/2006 | Donovan et al. | 709/203 |
| 2006/0075425 | A1 | 4/2006 | Koch et al. | |
| 2006/0095511 | A1 | 5/2006 | Munarriz et al. | |
| 2006/0106936 | A1 | 5/2006 | De Luca | |
| 2006/0117378 | A1 | 6/2006 | Tam et al. | |
| 2006/0123014 | A1 | 6/2006 | Ng | |
| 2006/0129455 | A1 | 6/2006 | Shah | |
| 2006/0135232 | A1* | 6/2006 | Willis | 463/1 |
| 2006/0141923 | A1 | 6/2006 | Goss | |
| 2006/0155732 | A1 | 7/2006 | Momose | |
| 2006/0168616 | A1 | 7/2006 | Candelore | |
| 2006/0194595 | A1 | 8/2006 | Myllynen et al. | |
| 2006/0200460 | A1 | 9/2006 | Meyerzon et al. | |
| 2006/0200461 | A1 | 9/2006 | Lucas et al. | |
| 2006/0204601 | A1 | 9/2006 | Palu | |
| 2006/0206586 | A1 | 9/2006 | Ling et al. | |
| 2006/0229941 | A1* | 10/2006 | Gupta | 705/14 |
| 2006/0242129 | A1 | 10/2006 | Libes | |
| 2006/0276170 | A1 | 12/2006 | Radhakrishnan et al. | |
| 2006/0276213 | A1 | 12/2006 | Gottschalk et al. | |
| 2006/0282328 | A1* | 12/2006 | Gerace et al. | 705/14 |
| 2006/0286963 | A1 | 12/2006 | Koskinen et al. | |
| 2006/0286964 | A1 | 12/2006 | Polanski et al. | |
| 2006/0288124 | A1 | 12/2006 | Kraft et al. | |
| 2007/0003064 | A1 | 1/2007 | Wiseman | |
| 2007/0004333 | A1 | 1/2007 | Kavanti | |
| 2007/0022010 | A1* | 1/2007 | Blaser et al. | 705/14 |
| 2007/0022442 | A1* | 1/2007 | Gil | G06F 17/30905 725/62 |
| 2007/0047523 | A1 | 3/2007 | Jiang | |
| 2007/0055439 | A1 | 3/2007 | Denker | |
| 2007/0055440 | A1 | 3/2007 | Denker | |
| 2007/0061568 | A1 | 3/2007 | Lee | |
| 2007/0072631 | A1 | 3/2007 | Mock et al. | |
| 2007/0074262 | A1 | 3/2007 | Kikkoji et al. | |
| 2007/0083602 | A1 | 4/2007 | Heggenhougen et al. | |
| 2007/0088687 | A1 | 4/2007 | Bromm et al. | |
| 2007/0088801 | A1 | 4/2007 | Levkovitz et al. | |
| 2007/0088851 | A1 | 4/2007 | Levkovitz et al. | |
| 2007/0100805 | A1 | 5/2007 | Ramer et al. | |
| 2007/0105536 | A1 | 5/2007 | Tingo, Jr. | |
| 2007/0106899 | A1 | 5/2007 | Hideyuki | |
| 2007/0113243 | A1 | 5/2007 | Brey | |
| 2007/0117571 | A1 | 5/2007 | Musial | |
| 2007/0149208 | A1 | 6/2007 | Syrbe et al. | |
| 2007/0157247 | A1 | 7/2007 | Cordray et al. | |
| 2007/0202922 | A1 | 8/2007 | Myllynen | |
| 2007/0204061 | A1 | 8/2007 | Chen | |
| 2007/0239527 | A1* | 10/2007 | Nazer et al. | 705/14 |
| 2007/0255614 | A1* | 11/2007 | Ourednik et al. | 705/10 |
| 2007/0290787 | A1 | 12/2007 | Fiatal et al. | |
| 2008/0004046 | A1 | 1/2008 | Mumick et al. | |
| 2008/0013537 | A1 | 1/2008 | Dewey et al. | |
| 2008/0032703 | A1 | 2/2008 | Krumm et al. | |
| 2008/0032717 | A1 | 2/2008 | Sawada et al. | |
| 2008/0057917 | A1 | 3/2008 | Oria | |
| 2008/0070579 | A1 | 3/2008 | Kankar et al. | |
| 2008/0071875 | A1 | 3/2008 | Koff et al. | |
| 2008/0082686 | A1 | 4/2008 | Schmidt et al. | |
| 2008/0123856 | A1 | 5/2008 | Won | |
| 2008/0130547 | A1 | 6/2008 | Won | |
| 2008/0132215 | A1 | 6/2008 | Soderstrom et al. | |
| 2008/0195468 | A1 | 8/2008 | Malik | |
| 2008/0215418 | A1* | 9/2008 | Kolve | G06Q 30/02 705/14.42 |
| 2008/0243619 | A1 | 10/2008 | Sharman et al. | |
| 2008/0294523 | A1 | 11/2008 | Little | |
| 2008/0301303 | A1 | 12/2008 | Matsuoka | |
| 2009/0132368 | A1* | 5/2009 | Cotter | G06Q 30/0257 705/14.55 |
| 2009/0239661 | A1 | 9/2009 | Acres | |
| 2009/0275315 | A1 | 11/2009 | Alston | |
| 2009/0299840 | A1* | 12/2009 | Smith | 705/14.19 |
| 2010/0262464 | A1* | 10/2010 | Monteforte et al. | 705/10 |
| 2011/0022475 | A1* | 1/2011 | Inbar et al. | 705/14.66 |
| 2011/0066497 | A1* | 3/2011 | Gopinath et al. | 705/14.53 |
| 2011/0258039 | A1* | 10/2011 | Patwa et al. | 705/14.45 |
| 2011/0258049 | A1* | 10/2011 | Ramer et al. | 705/14.66 |
| 2011/0282739 | A1* | 11/2011 | Mashinsky et al. | 705/14.53 |

FOREIGN PATENT DOCUMENTS

| | | |
|---|---|---|
| DE | 10061984 | 6/2002 |
| EP | 0831629 | 3/1998 |
| EP | 1043905 | 10/2000 |
| EP | 1073293 | 1/2001 |
| EP | 1 083 504 A2 | 3/2001 |
| EP | 1107137 | 6/2001 |
| EP | 1109371 | 6/2001 |
| EP | 1195701 | 4/2002 |
| EP | 1220132 | 7/2002 |
| EP | 1239392 | 9/2002 |
| EP | 1280087 | 1/2003 |
| EP | 1320214 | 6/2003 |
| EP | 1365604 | 11/2003 |
| EP | 1408705 | 4/2004 |
| EP | 1455511 | 9/2004 |
| EP | 1509024 | 2/2005 |
| EP | 1528827 | 5/2005 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| EP | 1772822 | 4/2007 |
| GB | 2369218 | 5/2002 |
| GB | 2372867 | 9/2002 |
| GB | 2380364 | 4/2003 |
| GB | 2386509 | 9/2003 |
| GB | 2406996 | 4/2005 |
| GB | 2414621 | 11/2005 |
| GB | 2416887 | 2/2006 |
| GB | 2424546 | 9/2006 |
| JP | 2002/140272 | 5/2002 |
| JP | 2007-087138 | 4/2007 |
| JP | 2007-199821 | 8/2007 |
| WO | 89/10610 | 11/1989 |
| WO | 96/24213 | 8/1996 |
| WO | 00/44151 | 7/2000 |
| WO | 00/70848 | 11/2000 |
| WO | 01/22748 | 3/2001 |
| WO | 01/31497 | 5/2001 |
| WO | 01/44977 | 6/2001 |
| WO | 01/50703 | 7/2001 |
| WO | 01/52161 | 7/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/91400 | 11/2001 |
| WO | 01/93551 | 12/2001 |
| WO | 01/97539 | 12/2001 |
| WO | 02/09431 | 1/2002 |
| WO | 02/23489 | 3/2002 |
| WO | 02/31624 | 4/2002 |
| WO | 02/35324 | 5/2002 |

(56) References Cited

FOREIGN PATENT DOCUMENTS

| | | | |
|---|---|---|---|
| WO | 02/44989 | | 6/2002 |
| WO | 02/50632 | | 6/2002 |
| WO | 02/054803 | | 7/2002 |
| WO | 02/069585 | | 9/2002 |
| WO | 02/069651 | | 9/2002 |
| WO | 02/075574 | | 9/2002 |
| WO | 02/084895 | | 10/2002 |
| WO | 02/086664 | | 10/2002 |
| WO | 02/091238 | | 11/2002 |
| WO | 02/096056 | | 11/2002 |
| WO | 02/100121 | | 12/2002 |
| WO | 03/015430 | | 2/2003 |
| WO | 03/019845 | | 3/2003 |
| WO | 03/019913 | | 3/2003 |
| WO | 03/024136 | | 3/2003 |
| WO | 03/049461 | | 6/2003 |
| WO | 03/088690 | | 10/2003 |
| WO | 2004/057578 | | 7/2004 |
| WO | 2004/084532 | | 9/2004 |
| WO | 2004/086791 | | 10/2004 |
| WO | 2004/093044 | | 10/2004 |
| WO | 2004/100470 | | 11/2004 |
| WO | 2004/100521 | | 11/2004 |
| WO | 2004/102993 | | 11/2004 |
| WO | 2004/104867 | | 12/2004 |
| WO | 2005/020578 | | 3/2005 |
| WO | 2005/029769 | | 3/2005 |
| WO | 2005/073863 | | 8/2005 |
| WO | 2005/076650 | | 8/2005 |
| WO | 2006/002869 | | 1/2006 |
| WO | 2006/005001 | | 1/2006 |
| WO | 2006/016189 | | 2/2006 |
| WO | 2006/024003 | | 3/2006 |
| WO | 2006/027407 | | 3/2006 |
| WO | 2006/040749 | | 4/2006 |
| WO | 2006/093284 | | 9/2006 |
| WO | 2006/104895 | | 10/2006 |
| WO | 2006/119481 | | 11/2006 |
| WO | 2007/001118 | | 1/2007 |
| WO | 2007/002025 | | 1/2007 |
| WO | 2007/060451 | | 5/2007 |
| WO | 2007/091089 | | 8/2007 |
| WO | 2008/013437 | | 1/2008 |
| WO | 2008/024852 | | 2/2008 |
| WO | 2008/045867 | | 4/2008 |
| WO | 2008/147919 | | 12/2008 |
| WO | 2009/088554 | | 7/2009 |
| WO | 2009/088554 | A2 | 7/2009 |
| WO | WO2009/088554 | | 7/2009 |

OTHER PUBLICATIONS

"Communication Pursuant to Article 94(3) EPC dated Oct. 19, 2009", European Patent Application No. 08 153 258.2 (5 pages), Oct. 19, 2009.
"Communication Pursuant to Article 94(3) EPC dated Feb. 10, 2009", European Patent Office in related European Patent Application No. 07 118 601.9 (3 pages), Feb. 10, 2009.
"Communication Pursuant to Article 94(3) EPC issued Jun. 25, 2009", European Patent Application No. 08 159 331.1 (3 pages), Jun. 25, 2009.
"Digital Rights Management in the Mobile Environment", Y.Raivio &S. Luukkainen, Proceedings of the International Conference on E-Business and Telecommunication, ICETE 2006, Aug. 7, 2006.
"DRM Architecture Approved Version 2.0", OMA-AD-DRM-V2_0-20060303-A (Open Mobile Alliance, Ltd.), Mar. 3, 2006.
"English translation of First Office Action issued by State Intellectual Property Office of People's Republic of China", Chinese Application No. 200480033236.X (8pages), Dec. 4, 2009.
"English Translation of First Office Action issued by the Chinese Patent Office", Chinese Application No. 200480019404.X, Aug. 19, 2008.
"European Examination Report dated Nov. 3, 2008", European Patent Application EP 08159333.7, Nov. 3, 2008.
"European Examination Report dated Nov. 3, 2008", European Patent Application No. EP 08159331.1, Nov. 3, 2008.
"European Search Report Nov. 5, 2008", European Patent Application No. EP 08159331.1, Nov. 5, 2008.
"European Search Report Jul. 22, 2008 issued by European Patent Office", EPO Application No. EP 08153651.8, Jul. 22, 2008.
"European Search Report dated Nov. 5, 2008", European Patent Application No. EP 08159333.7, Nov. 5, 2008.
"European Search Report dated Apr. 7, 2010", European Patent Application No. EP 10153358.6 (6 pages).
"European Search Report dated Jul. 18, 2008", European Patent Office in related EPO Application No. 08 15 3658, Jul. 18, 2008.
"European Search Report dated Jul. 18, 2008", European Patent Office in related EPO Application No. EP 08 15 3656, Jul. 18, 2008.
"European Search Report dated Jul. 22, 2008", European Patent Office in related EPO Application No. EP 08153651.8, Jul. 22, 2008.
"European Search Report dated Jul. 23, 2008", European Patent Office in related EPO Application No. EP 08153654.2, Jul. 23, 2008.
"European Search Report dated Apr. 18, 2008", European Patent Application No. 08101188.4, Apr. 18, 2008.
"European Search Report dated Mar. 19, 2008", European Patent Office in counterpart European Application No. EP 07 11 8601, Mar. 19, 2008.
"Extended European Search Report dated Dec. 2, 2008", European Patent Office in counterpart EPO Application No. EP 07120620.5, Dec. 2, 2008.
"Extended European Search Report dated Dec. 29, 2008", European Patent Office in counterpart EPO Application No. EP 07120480.4, Dec. 29, 2008.
"Ghassan Chaddoud, et al.", Dynamic Group Communication Security, pp. 49-56, IEEE 2001, 2001.
"International Search Report and Written Opinion of the International Search Authority", International Patent Application No. PCT/EP2008/051229, May 8, 2008.
"International Search Report and Written Opinion of the International Searching Authority", International Application PCT/EP2008/054911, Nov. 11, 2008.
"International Search Report for International Application", PCT/FI2006/050467, dated Jul. 25, 2007.
"International Search Report in PCT Application No. PCT/GB2004/003890", Apr. 5, 2005.
"Office Action", U.S. Appl. No. 12/002,452 (20 pages), Apr. 9, 2009.
"Office Action (Notice of Allowance)", USPTO dated Jun. 11, 2009 in U.S. Appl. No. 12/079,312 (5 pages).
"Office Action dated Jan. 28, 2009 in U.S. Appl. No. 10/571,709", Jan. 28, 2009.
"Office Action dated Mar. 22, 2010", U.S. Appl. No. 12/431,961 (19 pages), Mar. 22, 2010.
"Office Action dated Apr. 6, 2009 in related U.S. Appl. No. 12/156,335 (17 pages)", Apr. 6, 2009.
"Office Action dated Jun. 21, 2010", U.S. Appl. No. 10/555,543 (17 pages), Jun. 21, 2010.
"Office Action dated Apr. 6, 2009", U.S. Appl. No. 10/555,543 (14 pages), Apr. 6, 2009.
"Office Action dated Feb. 5, 2009", U.S. Appl. No. 12/079,312 (12 pages), Feb. 5, 2009.
"Office Action dated Mar. 9, 2011", Issued in related U.S. Appl. No. 12/477,766 (27 pages).
"Office Action from British Intellectual Property Office", British Application No. GB0712281.5 (5 pages), Oct. 9, 2008.
"Office Action issued Apr. 22, 2010", U.S. Appl. No. 12/156,335 (16 pages), Apr. 22, 2010.
"Office Action issued by USPTO dated Nov. 20, 2009", U.S. Appl. No. 10/571,709 (20 pages), Nov. 20, 2009.
"Office Action issued from the USPTO dated Nov. 4, 2010", U.S. Appl. No. 12/431,961 (22 pages), Nov. 4, 2010.
"Office Action issued from the USPTO dated Aug. 14, 2009", U.S. Appl. No. 12/431,961 (12 pages), Aug. 14, 2009.
"Office Action issued from the USPTO dated Sep. 23, 2009", U.S. Appl. No. 12/156,335 (19 pages), Sep. 23, 2009.
"Office Action issued from USPTO", in related U.S. Appl. No. 10/555,543 (29 pages), Oct. 20, 2009.

(56) References Cited

OTHER PUBLICATIONS

"Office Action Issued from USPTO dated Oct. 5, 2009", U.S. Appl. No. 10/571,709 (26 pages), Oct. 5, 2009.
"Office Action Issued Jan. 12, 2011 by the USPTO", U.S. Appl. No. 12/484,454 (10 pages).
"Office Action Issued Mar. 29, 2011 by the USPTO", U.S. Appl. No. 10/555,543 (17 pages), Mar. 29, 2011.
"Office Action Mar. 24, 2009", U.S. Appl. No. 12/156,335, Mar. 24, 2009.
"Official Action from the European Patent Office", European Application No. 08 717 428.0 (4 pages), Apr. 1, 2009.
"PCT International Preliminary Report on Patentability and Written Opinion", Issued by the International Bureau of WIPO EP2008/054911, dated Oct. 27, 2009 (1 page), Oct. 27, 2009.
"PCT International Search Report (Form PCT/ISA/210)", International Application PCT/EP2008/052678, Jul. 4, 2008.
"PCT International Search Report issued by PCT International Searching Authority", International Searching Authority in connection with the related PCT International Application No. PCT/NL2004/000335 (2 pages), Sep. 24, 2004.
"Schulzrinne et al, "RTP: A Transport Protocol for Real-Time Applications"", Network Working Group Request for Comments: 3550, p. 1-98, Jul. 1, 2003.
"Search Report under Section 17 dated May 20, 2008", British Patent Office in counterpart UK Application No. GB0807153.2, May 20, 2008.
"Text of Second Office Action (English Translation)", Jun. 12, 2009 in corresponding Chinese Patent Application No. 200480019404.X (2 pages).
"U.K. Combined Search and Examination Report under Sections 17 and 18(3)", U.K. Application No. GB0802177.6, May 13, 2008.
"U.K. Further Search Report under Section 17", U.K. Application No. GB0710853.3, Dec. 5, 2007.
"U.K. Patent Office Examination Report under Section 18(3)", U.K Application No. GB0315984.5, Mar. 29, 2006.
"U.K. Search Report under Section 17", U.K. Application No. GB0710853.3, Oct. 3, 2007.
"U.K. Search Report under Section 17 dated Mar. 3, 2005", U.K Application Serial No. GB0420339.4, Mar. 3, 2005.
"United Kingdom Search Report under Section 17", GB 0712281.5 (2 pages), Oct. 24, 2007.
"Wallner et al., "Key Management for Multicast: Issues and Architectures"", National Security Agency Network Working Group Request for Comments: 2627, p. 1-22, Jun. 1, 1999.
Levine, Robert , "New Model For Sharing: Free Music with Ads", The New York Times (On-Line Edition), Apr. 23, 2007.

* cited by examiner

PRESENTING CONTENT PACKAGES BASED ON AUDIENCE RETARGETING

BACKGROUND

1. Technical Field

The present disclosure relates to electronic content delivery and more specifically to intelligent targeting of invitational content to a user based on the user's previous activities.

2. Introduction

Targeted content delivery has long been an accepted means of conveying a desired message to an audience. Instead of creating a single message and delivering it to every member of the general public, content providers will attempt to identify the intended audience and shape the message so that it appeals to that audience. Once the content provider determines the intended audience they can target that audience by selecting the best content delivery channels. For example, if their intended audience is the residents of a particular city then delivering the message through the local newspaper or on a billboard in the city may be the appropriate channel. However, if their audience is a smaller subset of the population or is more geographically diverse such a delivery channel will be suboptimal. Content providers will also often target the content delivery by sculpting the content and appearance of the message for the intended audience. These techniques enable content providers to optimize their resources.

The development of digital content has enabled new techniques of targeting content to an audience. However, these techniques are often overly simplistic because targets are often selected based on a limited number of inputs. For example, if a user purchases a particular item on a website, additional related items can be suggested, or if a user visits a travel website, travel related content can be presented. Such methods are overly simplistic and fail to consider other important factors when targeting content to an audience.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The presently disclosed technology intelligently retargets invitational content to a user, and in some specific embodiments the user is a user of a device configured to communicate via a mobile network, i.e., a device that can be characterized in part by its use of a non-persistent connection, or multiple connections. It does so by first identifying a user on a network and analyzing usage data associated with that user. The usage data includes data describing contextual characteristics, which can be any data related to the user's network usage in one or more contexts such as usage data with respect to a presented item of invitational content, usage data with respect to favorite content, usage data with respect to temporal considerations, and other data which is more fully described herein.

The collective data can be used to create one or more user profiles, which can be analyzed and used to allow a content delivery system to more intelligently select content for a user. In some embodiments, the more intelligently selected the content is, the more efficient it is at eliciting a desired user response. For example, data can be collected regarding a user's responsiveness to a presented item of invitational content, and based on an analysis of that data, and the other data in the user profile, the item of invitational content can be re-presented to the user in a modified form or different context and accordingly, be more likely to elicit the invited response.

In one example, an item of invitational content that was previously presented and failed to gain the desired response can be re-presented on a different channel, e.g. website, application, groups of websites or applications having similar content, a device used to present content, or any other hardware or software used to present content to a user. In such examples, the different channel can be a channel on which the user previously converted a different item of invitational content; the channel can be a favorite channel which the user visits/uses more often; the channel can be one which is associated with a content category for which the user is known to have previously converted an item of invitational content; and the channel can be one which other users have been more likely to convert the same or a different item of invitational content.

In another example, an item of invitational content that was previously presented and failed to gain the desired response can be re-presented in a modified form. In such examples, the modified form comprises a different color scheme; the modified form comprises an incentive to accept the terms of the invitation; the modified form comprises less onerous requirements to perform a conversion action; the modified form can include other changes to the requested action by the user; and the modified form can include a modified product offering, etc.

In another example, an item of invitational content that was previously presented and failed to gain the desired response can be re-presented at a different time or when the user is in a different place. In such examples, the different time can be a time when it is more likely that the user will consider the invitational content, such as perhaps the weekend as opposed to working hours. The different place likewise can be a place where it is more likely that the user will consider the invitational content, such as on a train or bus or at home as opposed to while driving or at work.

The examples provided above are merely illustrative of some of the ways in which the user's profile is used to inform decisions to retarget content such as invitational content.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure addresses the need in the art for improved methods of selecting invitational content presented to a user based on the user's interactions with previously presented invitational content.

Figure 1:
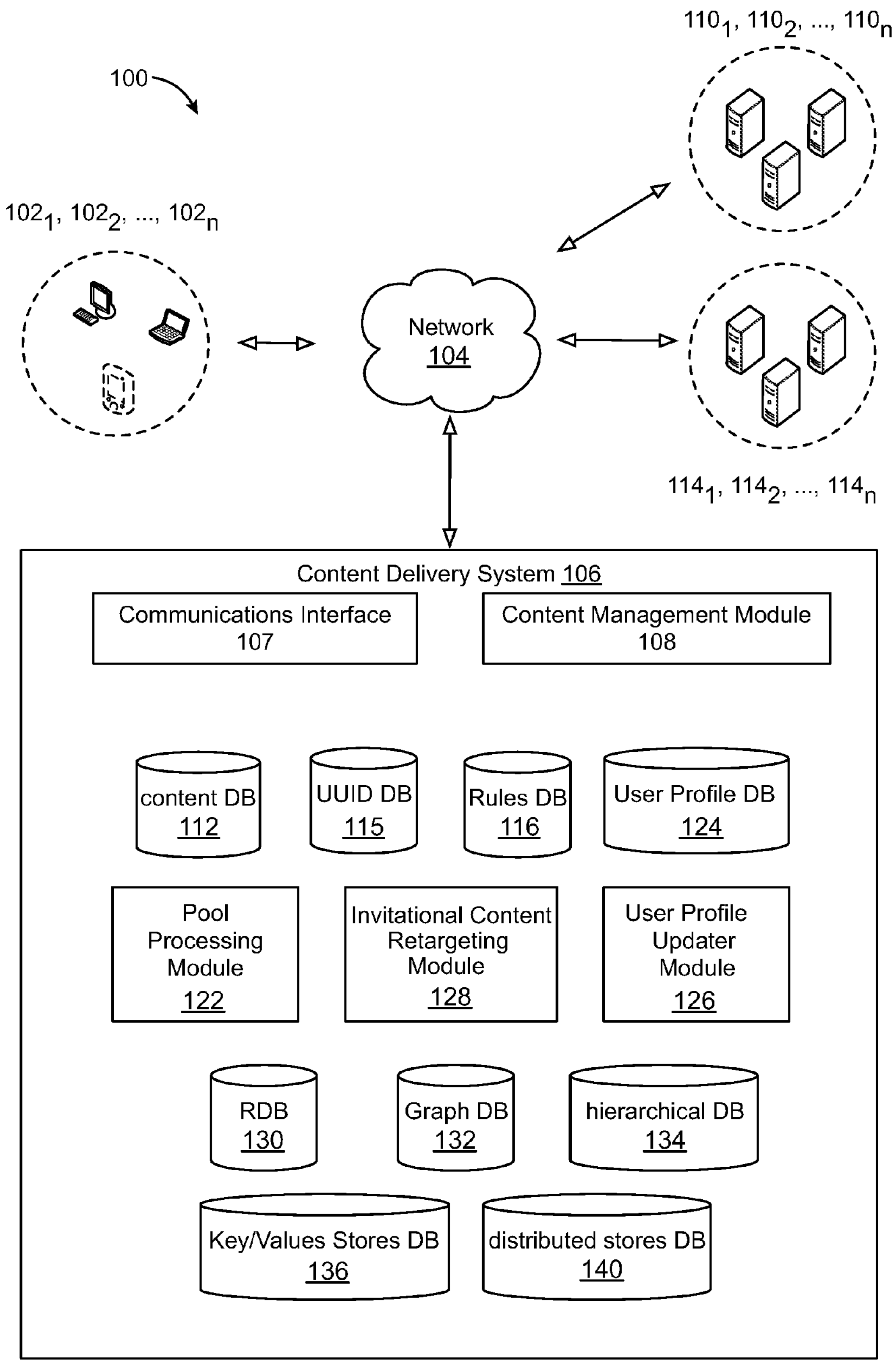
FIG. 1 illustrates an exemplary configuration of devices and a network.

The presently disclosed system and method is particularly useful for assembling and delivering targeted content to a user. An exemplary system configuration 100 is illustrated in FIG. 1 wherein electronic devices communicate via a network for purposes of exchanging content and other data. The system can be configured for use on a local area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a content package is delivered to user terminals $\mathbf{102}_1 \ldots \mathbf{102}_n$ (collectively "102") connected to a network 104 by direct and/or indirect communications with a content delivery system 106. In particular, the content delivery system 106 receives a request for an electronic content, such as a web page, an application, or media, etc., from one of user terminals 102. Thereafter, the content delivery system 106 assembles a content package in response to the request and transmits the assembled content package to the requesting one of user terminals 102. In some embodiments, the server has preassembled the content package before the request is received. The content in the assembled content package can include text, graphics, audio, video, executable code or any combination thereof. Further, the assembled content packages can include invitational content designed to inform or elicit a pre-defined response from the user and that can vary over time. The content delivery system can include a communications interface 107 to facilitate communications with the user terminals 102 and any other components familiar to those of ordinary skill in the art.

The content delivery system 106 includes a content management module 108 that facilitates generation of the assembled content package that includes invitational content. Specifically, the content management module can combine content from one or more primary content providers $\mathbf{110}_1 \ldots \mathbf{110}_n$ (collectively "110") and content from one or more secondary content providers $\mathbf{114}_1 \ldots \mathbf{114}_n$ (collectively "114") to generate the assembled content package for the user terminals 102. In some embodiments, the content management module can create a package from only secondary content, or only secondary content. The package need not contain both primary and secondary content.

Although, primary and secondary providers 110, 114 are presented herein as discrete, separate entities, this is for illustrative purposes only. In some cases, the primary and secondary providers 110, 114 can be the same entity. Thus, a single entity may define and provide both primary and secondary content. Although, both the primary and secondary content can comprise invitational content, in most instances, the secondary content will comprise the invitational content portion.

For example, in the case of a web page delivered to a requesting one of user terminals 102, the content management module 108 can assemble a content package by requesting the data for the web page from one of the primary content providers 110 maintaining the web page. Then the time-varying invitational content on the web page, which is provided by the secondary content providers 114, is obtained according to the arrangement between the primary and secondary content providers 110 and 114. For example, the invitational content from the secondary providers 114 can be selected based on a guaranteed number of impressions. Alternatively, the invitational content from the secondary providers 114 can be selected based on the context of the web page. In another example arrangement, the primary content can be sent separately, from a source other than the content delivery system disclosed here, or the primary content can have been previously downloaded and cached on the user terminal 102 requesting the content. In such instances, the content delivery system can send a content package containing time-varying invitational content for use, or display with, or related to, the primary content. However, any other arrangements and configuration for selecting invitational content from the secondary providers 110 can also be used.

Although the content management module 108 can be configured to request that data be sent directly from content providers 110 and 114, a cached arrangement can also be used to improve performance of the content delivery system 106 and improve overall user experience. That is, the content delivery system 106 can include a content database 112 for locally storing/caching content maintained by content providers 110 and 114. The data in the content database 112 can be refreshed or updated on a regular basis to ensure that the content in the database 112 is up to date at the time of a request from a user terminal. However, in some cases, the content management module 108 can be configured to retrieve data directly from content providers 110 and 114 if the metadata associated with the data in content database 112 appears to be outdated or corrupted.

In the various embodiments, the content delivery system 106 can also include a unique user identifier (UUID) database 115 that can be used for managing sessions with the various user terminal devices 102. The UUID database 115 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 115. Such an assignment can be provided by analyzing requesting device attributes in order to determine whether such requests can be attributed to the same device. Such attributes can include device or group-specific attributes.

As described above, content maintained by the content providers 110 and 114 can be combined and/or presented according a predefined arrangement between the two content providers, which can be embodied as a set of rules. In an arrangement where the content delivery system assembles the content package from multiple content providers, these rules can be stored in a rules database 116 in content delivery system 106 and content management module 108 can be configured to assemble the content package for user terminals 102 based on these rules. The rules can specify how to select content from secondary content providers 114 and the primary content providers 110 in response to a request from one of user terminals 102. For example, in the case of a web page maintained by one of primary providers 110 and including variable advertisement portions, the rules database 116 can specify rules for selecting one of the secondary providers 114. The rules can also specify how to select specific content from the selected one of secondary providers 114 to be combined with the content provided by one of primary providers 110. Once assembled, the assembled content package can be sent to a requesting one of user terminals. However, the content package is not limited to the content from content providers 110 and 114. Rather, the content package can include other data generated at the content delivery system 106.

As described above, arrangements between the content providers 110 and 114 can result in content from one of primary content providers 110 being combined with invitational content from multiple ones of secondary content providers 114, based on the rules database 116. Although the rules database 116 can be accessed each time a request is received from one of user terminals 102, such a configuration can limit performance. Therefore, in many cases, the rules in rules database 116 are used to define at least one pool of invitational content from the secondary providers 114. Thus, when the content management module 108 assembles a content package, the content management module 108 first constructs and/or retrieves the pool. Thereafter, the content management module 108 can select an invitational content from one of the secondary content providers from the pool and form the assembled content package.

As used herein, the term "contextual characteristics" refers to the characteristics of a particular content package as related to a particular audience in the network 104 associated with one or more of user terminals 102. Contextual characteristics can include channel characteristics, demographic characteristics, behavioral characteristics, and spatial-temporal characteristics. Channel characteristics can define the specific delivery channel being used to deliver a content package. For example, channel characteristics can include a type of electronic content, a type of device or user terminal, a carrier or network provider, or any other characteristic that defines a specific delivery channel for the content package. Spatial-temporal characteristics can define a location, a date, a time, or any other characteristic that defines a geographic location and/or a time for delivery of the content package. Demographic characteristics can define personal and/or socio-economic characteristics of the user requesting the content package. Behavioral characteristics can define user behaviors for one or more different types of content, separately or in combination with any other contextual characteristics. That is, different behavioral characteristics may be associated with different channel, demographic, or spatial temporal characteristics. For example, users may be associated with higher conversion or response rates for some types of delivery channels.

One concern with the arrangements typically entered into by secondary content providers 114 is that they can result in invitational content of little or no interest being presented to users many times. As a result, even though a desired number of impressions can be achieved, the rate of response to such invitational content may be low and/or the resulting targeted audience may be incorrect or suboptimal. As a result, content providers 110 and 114 can be negatively impacted. For example, if the primary content providers 110 receive compensation based on the number or rate of conversions of invitational content provided by secondary content providers 114, the resulting low conversion rate will result in lower revenues for the primary content providers 110. At the same time, the lower number or rate of conversions of invitational content can result in lower exposure or sales for the secondary content provider 114. In the case of an arrangement based on the number of impressions, the primary content provider 110 would be compensated, but the lower number or rate of conversions of invitational content can result in lower exposure or sales for the secondary content provider 114. As a result, such secondary content providers 114 may opt to pursue relationships with other primary content providers 110, resulting in potential loss of revenues for some primary content providers 110.

The various embodiments therefore provide systems and methods for improving audience targeting by managing the presentation of invitational content from such secondary content providers 114. In particular, systems and methods are provided for adjusting invitational content within content delivery system 106 in order to provide invitational content at a user terminal that is of greater interest to an associated user. As a result, improved targeting of users is provided, which generally correlates to an increase in desired responses or conversions. In the various embodiments, the invitational content is adjusted based on the user's interactions with previously presented invitational content. As a result, the invitational content is presented in a manner and/or at a time that will likely elicit greater response from the requesting user.

In some embodiments, delivery system 106 can provide an invitational content retargeting module 128 for retargeting invitational content previously presented. The invitational content retargeting module 128 receives the invitational content, a context associated with a request, and identifying information for the user associated with the request. For example, such information can be received from the content management module 108 or other components in system 100. Thereafter, the invitational content retargeting module 128 can access a user profile database 124 to retrieve a user profile of previously presented invitational content and adjust the invitational content accordingly. The retargeted invitational content can then be provided, for example, to the content management module 108, which can thereafter assemble and deliver a content package to the requesting user terminal. Such a method is described in greater detail below with respect to FIG. 2.

In operation, delivery system 106 can provide a pool processing module 122 for creating a user-specific pool of invitational content. A pool-processing module 122 receives contextual characteristics and identifying information for the user associated with the request. Such information can be received from the content management module 108 or other components in system 100. The pool-processing module 122 operates on a pool of invitational content. The pool-processing module 122 can receive the pool along with the content and user identification or, alternatively, it can construct the pool. The pool processing module 122 can construct the pool by retrieving invitational content from the content database 112, the content management module 108, or directly from content providers 110 and 114. If the pool of invitational content has not already been adjusted to eliminate content not applicable to the contextual characteristics, the pool-processing module 122 can make this adjustment. Thereafter, the pool-processing module 122 can access a user-profile database 124, which can be constructed based at least in part on recorded contextual characteristics related to the user, to retrieve a user profile of previously presented invitational content to create the user-specific pool. The user-specific pool can then be provided, for example, to the content management module 108, which can thereafter assemble and deliver a content package to the requesting user terminal. Such a method is described in greater detail below with respect to FIG. 3.

In the various embodiments, the user-profile database 124 can be updated using a user-profile-update module 126. In some cases, the user-profile-update-module 126 can be configured to add additional profile data to the profile database 124. However, in other cases, an extended profile of user interactions with invitational content may not accurately reflect a current interest of users. Accordingly, update module 126 can also be configured to maintain the profile database 124 to include only more recently acquired data. For example, the update module 126 can be configured to maintain the profile database 124 to include only data from the last two to three months. However, the update module 126 can be configured to adjust the data in profile database 124 to cover any span of time. In some instances the update module 126 can update the profile database 124 in real-time. In some instances, the update module 126 can update the profile database 124 at least every week, or every day.

In the various embodiments, the system can include one or more additional databases implemented using various data structures such as, but not limited to, a relational database (RDB) 130, a graph database 132, a hierarchical database 134, a key/values stores database 136, and a distributed stores database 140.

Figure 2:
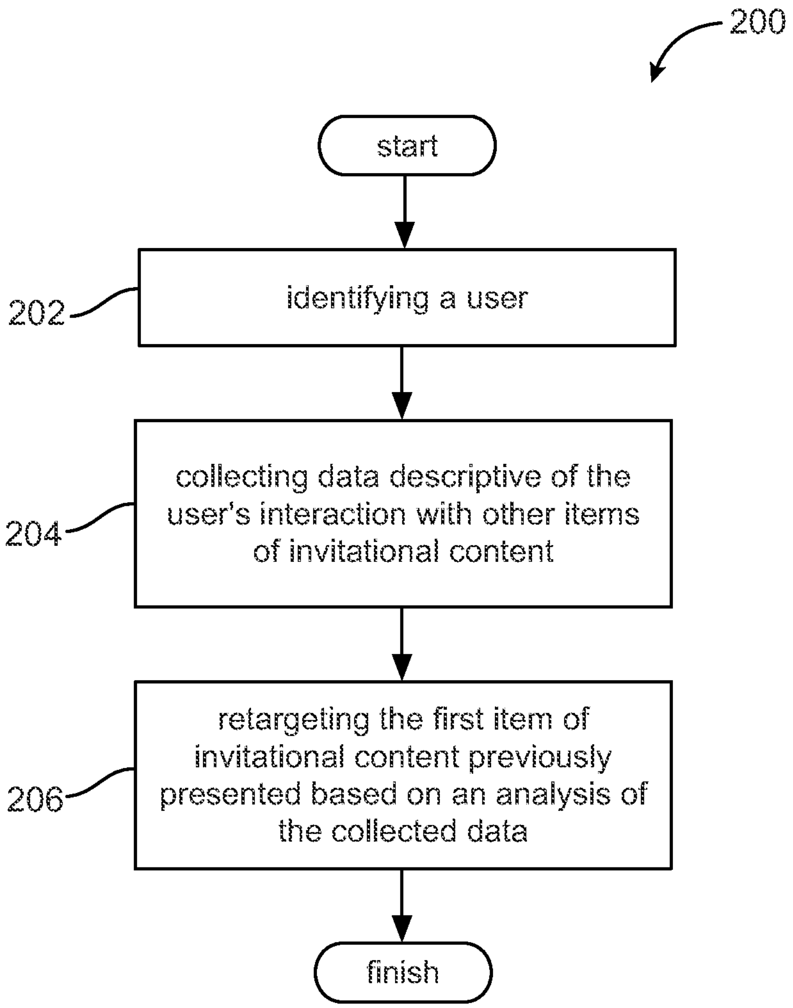
FIG. 2 illustrates an exemplary method embodiment.

FIG. 2 is a flowchart illustrating steps in an exemplary method 200 for retargeting invitational content based on a user's past interactions with invitational content. For the sake of clarity, this method is discussed in terms of an exemplary system such as is shown in FIG. 1. Although specific steps are shown in FIG. 2, in other embodiments a method can have more or less steps than shown. First, the content delivery system 106 identifies the user associated with the user terminal (202). This identification can be performed in a variety of ways. For example, as described above, when the delivery system 106 receives a request for a content package, the request can include some identifying information, associated with the requesting user terminal or the associated user. This information can then be correlated to an entry in the UUID database 115 to retrieve an identity of the user. In other configurations, the user can be identified by analyzing the requesting device's attributes in order to determine whether such requests can be attributed to a same device, also as described above. Other methods can also be used.

Meanwhile, the content delivery system 106 collects data descriptive of the user's interaction with one or more other items of invitational content within the network (204). The collected data can include any number of characteristics associated with a user's interaction with invitational content or any contextual characteristics such as channel, demographic, behavioral, and/or special-temporal characteristics. For example, the information can include where on the conversion continuum the user abandoned the process: did the user take the first step of maybe clicking on a supplied link or did the user make it all the way to placing an item in their electronic shopping cart. Additionally, information can be collected about the invitational content itself, e.g. colors, size, font, or what was actually offered. Alternatively, the system can make use of the relationship between the primary and secondary content, e.g. were the two tightly related or completed unrelated. The information can further include the channel, the device the user was using, the time of day, and/or day of week. A more extensive data set, both in terms of what is collected and for how many items of invitational content, can lead to more effective retargeting.

As discussed above, the delivery system 106 includes a user profile database 124. In some embodiments, the collected data can be stored in the user profile database 124. The delivery system 106 can receive a direct request to update one or more user profiles. The update request can come directly from the user or any other device capable of communicating with the delivery system 106, such as other content delivery networks or websites. The update request can occur at any time. The update request can include any of the collected data described above such as characteristics of one or more user's interaction with invitational content and/or contextual characteristics. Alternatively, the request for a content package can include the collected data. Once received, the collected data can be supplied to the user-profile-update module 126, which will update the user profiles for the users identified in the request.

The content delivery system 106 retargets the first item of invitational content previously presented based on an analysis of the collected data (206). In some embodiments, the collected data along with either the invitational content or a description of the invitational content is supplied to the invitational content retargeting module 128. The retargeting module 128 analyzes the data and reformulates the invitational content such that when presented to the user, the user is more likely to complete the associated conversion action. The reformulation can include such actions as altering the presentation of the content, e.g. changing the colors, fonts, etc.; adding to the invitational content; switching the invitational content for one that is similar; or switching the invitational content for one that is entirely different. Once retargeted, the invitational content can be used in the content package presented to the user.

In some embodiments, the content delivery system 106 retargets invitational content by re-presenting the first item of invitational content on a channel that that the user is known to have previously converted other items of invitational content. Often users are more likely to complete a conversion on invitational content presented through one channel rather than another. For example, a user may be more likely to purchase an advertised item when it is presented to them on a social networking site, but will not click the link for the item when it is presented to them on a news site. However, that same user may be willing to fill out an informational survey on the news site, but not the social networking site. An analysis of the collected data could reveal this propensity, thus, the user can be retargeted in a channel where the user is more likely to complete a conversion for the type of invitational content being offered.

In some embodiments, the content delivery system 106 retargets invitational content by re-presenting the first item of invitational content with an added incentive to complete the associated conversion action. For example, in many cases users will be presented with an advertisement to purchase a particular item only to abandon the purchase just prior to completing the transaction. In some cases this may occur because the user decided to comparison shop. An analysis of the collected data could reveal that the failed conversion resulted from comparison shopping. Based on this information the secondary content provider can retarget the user with an advertisement for the same item, but now the advertisement could include a discount or a bonus item.

In some embodiments, the content delivery system 106 retargets invitational content by re-presenting the first item of invitational content at a time when the user is more likely to complete the associated conversion action. Some items of invitational content can be timing sensitive. That is, content which when presented during a specific time of day or on a specific day of the week is more likely to fail to result in a conversion. However, if the very same item of invitational content is presented at a different time or on a different day, the rate of conversion is significantly higher. For example, if the user is presented with an invitation to watch a sporting event during their workday, they are unlikely to complete the conversion. However, if the user was presented with the same invitational content outside of their workday, e.g. in the evening, their rate of conversion increases. Furthermore, their rate of conversion may still further increase if the same invitational content is presented on their weekend. This limitation of presenting invitational content could be addressed by assuming a conventional workweek. However, more accurate retargeting can be achieved through the presently disclosed method by analyzing the collected data.

In some embodiments, the content delivery system 106 retargets invitational content by presenting a similar item of invitational content that has a lower conversion value than the first item of invitational content. For example, initially the user was presented with an offer to purchase the full version of a mobile phone application. At the time of the initial offer, the user may not have been convinced that the application would be worth the cost. In this situation, the content delivery system 106 can retarget the user by presenting a lite version of the application at either a reduced cost or for free. Additionally, whether the lite version is offered at a reduced cost or for free could be based on an analysis of the collected data.

Retargeting at a lower conversion value can also take the form of a conversion that requires less user action. For example, a possible conversion action could be getting a user to complete a form that requests a variety of contact information such as name, address, phone number, email address, etc. The user may be unwilling to complete such an extensive form either because of the amount of time required to complete the form or because they do not want to provide that much personal information. Analysis of the collected data could indicate that the user would likely complete the conversion if only required to supply a name and email address. This can have a lower conversion value for the secondary content provider, but a greater value than a completely failed conversion.

In some embodiments, the content delivery system 106 retargets invitational content by presenting a similar item of invitational content that has a higher conversion value than the first item of invitational content. For example, initially the user was presented with an offer for a lite version of a mobile phone application either for free or for a reduced price in comparison with the full version of the application. At the time of the initial offer, the user installed the lite version of the application. Analysis of the collected data could indicate first that the user downloaded and installed the lite version and second whether the user has used the lite version of the application. If so, the content delivery system 106 can retarget the user by presenting a full version of the application.

Figure 3:
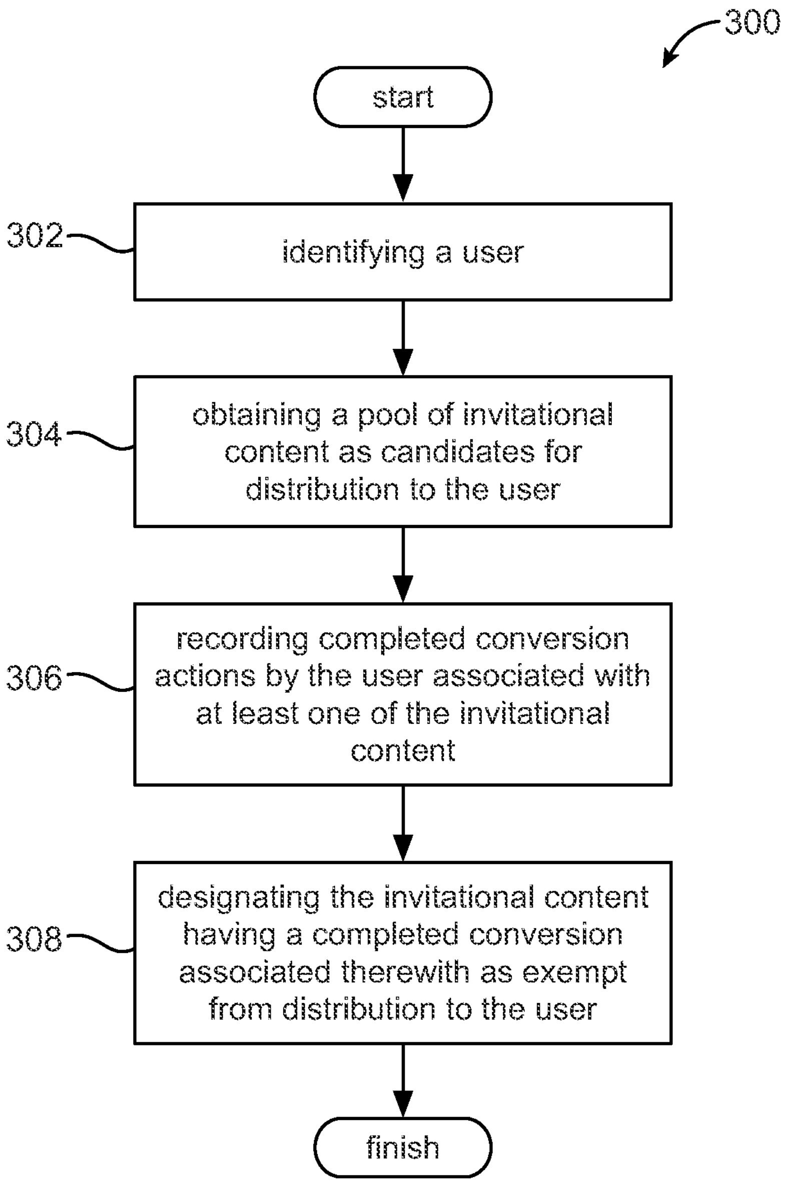
FIG. 3 illustrates an exemplary method embodiment.

FIG. 3 is a flowchart illustrating steps in an exemplary method 300 for creating the user-specific pool of possible invitational content that can be used in a content package presented to the user. For the sake of clarity, this method is discussed in terms of an exemplary system such as is shown in FIG. 1. Although specific steps are shown in FIG. 3, in other embodiments a method can have more or less steps than shown. To create a user-specific pool, the content delivery system 106 identifies the user associated with the user terminal (302). This identification can be performed in a variety of ways. For example, as described above, when the delivery system 106 receives a request for a content package, the request can include some identifying information, associated with the requesting user terminal or the associated user. This information can then be correlated to an entry in the UUID database 115 to retrieve an identity of the user. In other configurations, the user can be identified by analyzing the requesting device's attributes in order to determine whether such requests can be attributed to a same device, also as described above. Other methods can also be used.

The content delivery system 106 obtains a pool of invitational content as candidates for distribution to the user (304). The pool can consist of the actual invitational content and/or references to invitational content. This pool of content can be obtained in a number of ways. For example, as described above, the delivery system 106 can include a content database 112 where content is locally stored/cached. Alternatively, the content management module 108 can be configured to retrieve data directly from content providers 110 and 114.

In one embodiment, the obtained pool could contain all invitational content known by the delivery system 106. Alternatively, the obtained pool could be a subset of all invitational content based on contextual characteristics such as channel, demographic, behavioral, and/or spatial-temporal characteristics. As described above, when the delivery system 106 receives a request for a content package the request can include contextual characteristics. Then these characteristics can be used by the content management module to select only content applicable to the contextual characteristics from the content database 112 or to only retrieve data from one or more of content providers 110 and 114 that are associated with the contextual characteristics. For example, if the primary content can only be packaged with invitational content from a single secondary content provider, then the initial pool would only include invitational content supplied by that secondary content provider. Alternatively, if invitational content is designed to target particular demographics of users then only content matching the demographic of the user would be included.

Meanwhile, the delivery system 106 records completed conversion actions by the user associated with at least one of the invitational content (306). As described above, the delivery system 106 includes a user-profile database 124. In some embodiments, the delivery system 106 can receive a direct request to update one or more user profiles. The update request can come directly from the user or any other device capable of communicating with the delivery system 106, such as other content delivery networks or websites. The update request can occur at any time with respect to the conversion. For example, as the conversion occurs an update request can be sent or one or more completed conversions can be stored and sent at a later time. The request can include a record of completed conversion actions for the specified users. Alternatively, the request for a content package can include a record of completed conversion actions by the requesting user. The record of completed conversion actions can be supplied to the user-profile-update module 126, which will update the user profiles for the users identified in the request.

The content delivery system 106 designates the invitational content that has a completed conversion associated therewith as exempt from distribution to the user (308). In one embodiment this can be performed by the pool-processing module 122. As described above, the pool-processing module 122 receives a context and identifying information for the user associated with the request. The pool-processing module 122 also either receives or creates a pool of invitational content. The pool-processing module accesses the user profile database 124 to retrieve the most up to date user profile of completed conversion actions for previously presented invitational content. The pool-processing module 122 examines the invitational content and if the user profile indicates a completed conversion for any particular invitational content then it excludes the content from the user-specific pool. The user-specific pool can be the same pool as the original candidate pool where the invitational content is marked as included and/or excluded. For example, the processing pool module 122 could check, for each invitational content in the pool, the user profile for a completed conversion. If the profile indicates a completed conversion, the invitational content is designated excluded. Once the pool-processing module 122 designates all invitational content for which the user has completed the conversion action as excluded, any of the non-designated invitational content can be used in the content package presented to the user. Alternatively, the user-specific pool can be an entirely separate pool that only includes invitational content for which the user has yet to complete the conversion action. Then any of the invitational content in the resulting user-specific pool can be used in the content package presented to the user.

In some embodiments, invitational content that was previously excluded from the user-specific pool can be re-included. The user-profile-update module 126 can be configured to adjust the data in user-profile database 124 so that a completed conversion expires after a specified period of time. That is, even if the user has completed the conversion action for the invitational content, after a specified period of time it is considered that the user has yet to complete the conversion. In some embodiments, rather than relying on expiring conversions, the user-profile-update module can learn directly from the user terminal 102 or a content provider that the conversion has been reversed. This can happen, for example, if a conversion required download of a program, but the user uninstalled the program.

When a completed conversion action is noted as reversed, the pool-processing module 122 can either update the user-specific pool or create a new user-specific pool. For example, if the user-specific pool is simply the original-invitational-content pool with the content marked as excluded, then the pool-processing module 122 can update the pool by removing the exclude designation. Alternatively, if the user-specific pool is a completely separate pool then the pool-processing module 122 can update the user-specific pool by adding in the invitational content that is no longer considered to have a completed conversion action.

Figure 4:
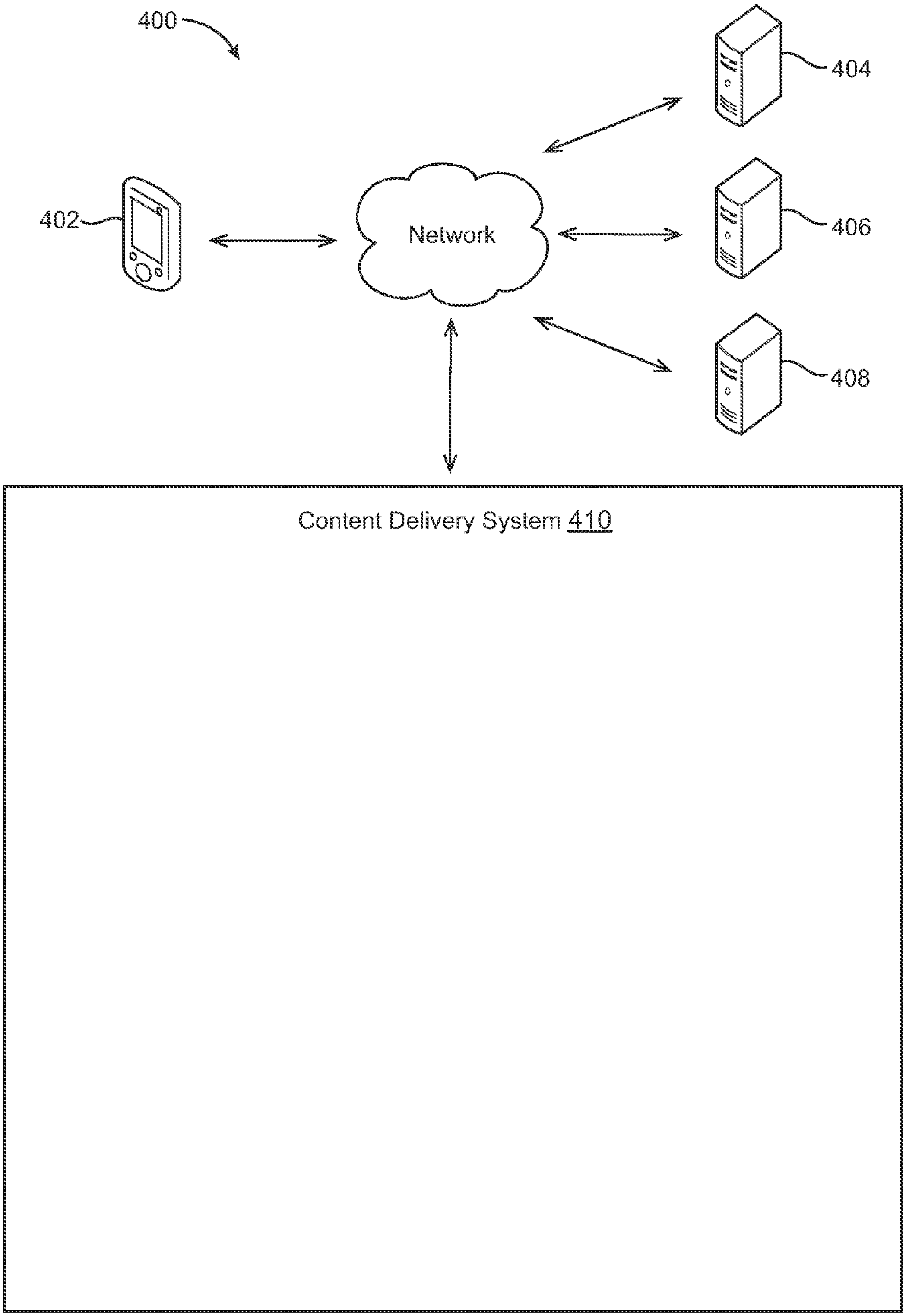
FIG. 4 illustrates an exemplary configuration of devices and a network associated with an audience exclusion scenario.

The disclosure now turns to an illustrative example of selecting an invitational content when audience exclusion is enabled. In this illustration, the invitational content takes the form of an advertisement. FIG. 4 illustrates an exemplary configuration of devices and a network (400). Content provider 404 is an electronic commerce retailer that sells a mobile phone as well as a variety of accessories for the phone. Content provider 404 has contracted with primary content providers 406 and 408 to display advertisements for content provider 404's mobile phone and/or the associated accessories on their websites. Content provider 404 has deposited a variety of advertisements with the content delivery system 410 along with usage criteria for each advertisement. These advertisements are stored in the content database.

The user of mobile phone 402 visits the website of primary content provider 406. When this occurs, a request is sent to the content delivery system 410 for a content package. The request includes a set of criteria that specifies the known information about the user 402 and the contextual characteristics. Based on the supplied context, the delivery system obtains the pool of advertisements supplied by content provider 404 from the content database. Because there are multiple possible advertisements, the delivery system obtains the user profile for user 402 from the user profile database. The user profile indicates that user 402 has yet to complete any of the conversion actions associated with the possible advertisements. Thus, the pool processing module makes no changes to the pool of candidate advertisements. Content provider 404 supplied a usage criteria for this scenario to instruct the delivery system 410 to select a general advertisement for the content provider 404's e-commerce website.

The selected advertisement is presented to the user 402 in the form of a banner ad on primary content provider 406's website. The user 402, sees the advertisement, clicks on it, and is redirected to content provider 404's website. Once at content provider 404's website, the user 402 ultimately completes a conversion by purchasing the offered mobile phone. Upon completing the conversion action associated with the advertisement, an update request is sent to the delivery system 410 instructing it to update the user profile for the user 402, which is handled by the user profile update module.

After purchasing the mobile phone, the user 402 navigates to the website for primary content provider 408. As with content provider 406, a request for an advertisement is sent to the delivery system 410 that includes the content and the known information about the user 402. Again the system content delivery system 410 obtains the pool of possible advertisements for content provider 404 from the content database. This time when the delivery system 410 checks the user profile for the user 402, it discovers the mobile phone purchase conversion. Based on this information, the pool processing module removes the advertisements that have an associated conversion action of mobile phone purchase from the pool of possible advertisements. The delivery system 410 then selects an advertisement from the remaining pool of candidate advertisements, which in this case is a general advertisement for accessories for content provider 404's mobile phone. The selected advertisement is presented to the user 402 on content provider 408's website.

Figure 5:
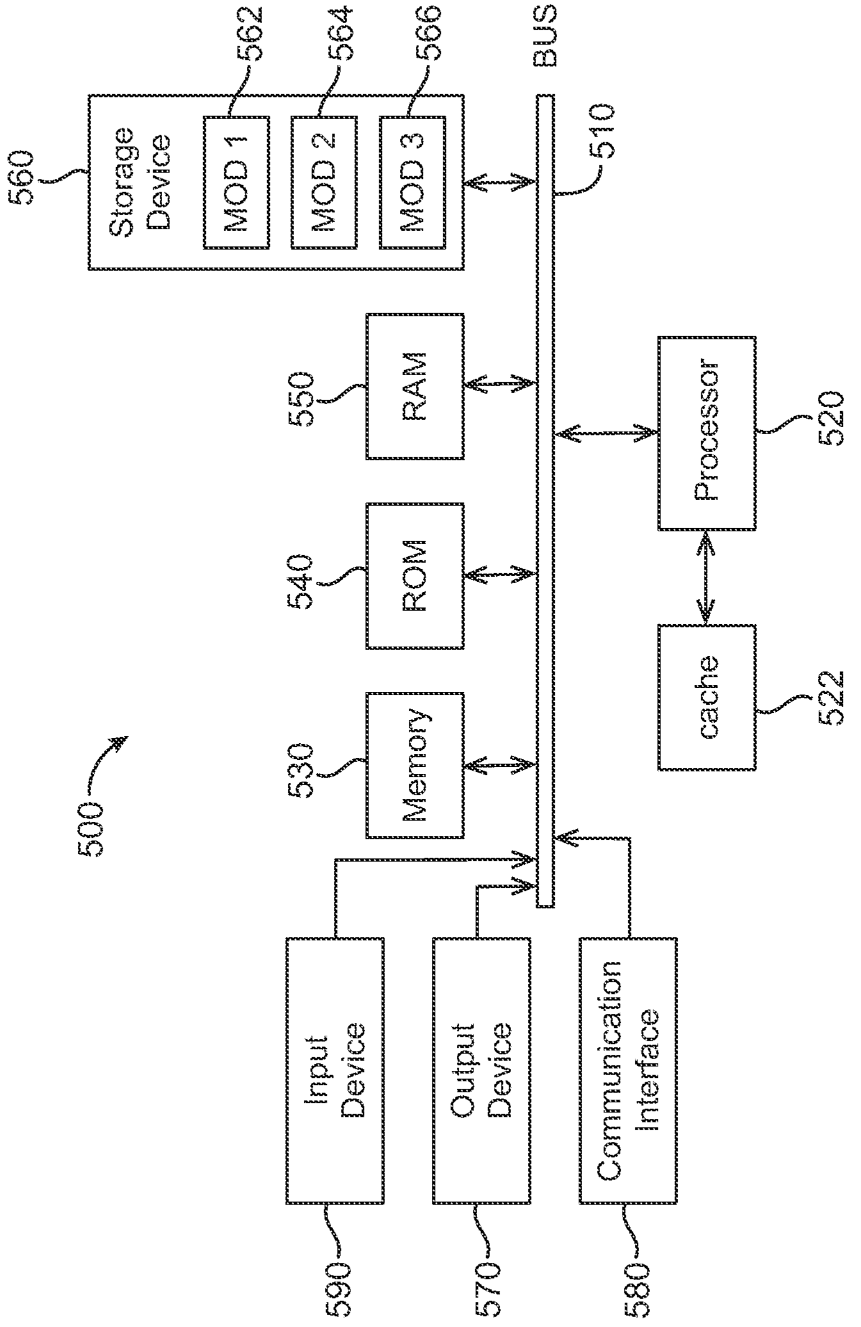
FIG. 5 illustrates an example system embodiment.

With reference to FIG. 5, an exemplary system 500 includes a general-purpose computing device 500, including a processing unit (CPU or processor) 520 and a system bus 510 that couples various system components including the system memory 530 such as read only memory (ROM) 540 and random access memory (RAM) 550 to the processor 520. The system 500 can include a cache 522 of high speed memory connected directly with, in close proximity to, or integrated as part of the processor 520. The system 500 copies data from the memory 530 and/or the storage device 560 to the cache 522 for quick access by the processor 520. In this way, the cache 522 provides a performance boost that avoids processor 520 delays while waiting for data. These and other modules can be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer readable storage media provide nonvolatile storage of computer readable instructions, data structures, program modules and other data for the computing device 500. In one aspect, a hardware module that performs a particular function includes the software component stored in a non-transitory computer-readable medium in connection with the necessary hardware components, such as the processor 520, bus 510, display 570, and so forth, to carry out the function. The basic components are known to those of skill in the art and appropriate variations are contemplated depending on the type of device, such as whether the device 500 is a small, handheld computing device, a desktop computer, or a computer server.

Although the exemplary embodiment described herein employs the hard disk 560, it should be appreciated by those skilled in the art that other types of computer readable media which can store data that are accessible by a computer, such as magnetic cassettes, flash memory cards, digital versatile disks, cartridges, random access memories (RAMs) 550, read only memory (ROM) 540, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations discussed below, and random access memory (RAM) 550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited non-transitory computer-readable storage media. Such logical operations can be implemented as modules configured to control the processor 520 to perform particular functions according to the programming of the module. For example, FIG. 5 illustrates three modules Mod1 562, Mod2 564 and Mod3 566 which are modules controlling the processor 520 to perform particular steps or a series of steps. These modules may be stored on the storage device 560 and loaded into RAM 550 or memory 530 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A method comprising:

obtaining contextual-characteristics data descriptive of a device's interaction with items of invitational content within a network of application-delivery channels, the device being associated with a user;

analyzing the contextual characteristics data to identify one or more modifications to a presentation of a same item of invitational content previously presented to the device , the one or more modifications being identified as having a higher likelihood of conversion, and the one or more modifications comprising a modified form of the same item of invitational content on a different network channel, wherein the different network channel comprises a different website or a different digital media channel; and retargeting the same item of invitational content responsive to a failure by the user to convert the same item of invitational content when previously presented, wherein retargeting comprises re-presenting the same item of invitational content according to the one or more modifications.

2. The method of claim 1, further comprising:

identifying a different delivery channel having a higher conversion rate than a current delivery channel used to present the same item of invitational content to the device by comparing a first conversion rate of the delivery channel with a second conversion rate of the current delivery channel; and retargeting the same item of invitational content using the different delivery channel having the higher conversion rate.

3. The method of claim 1, wherein the retargeting includes re-presenting the same item of invitational content to the device with an added incentive to convert the same item of invitational content, the incentive comprising at least one of a discount and a bonus item.

4. The method of claim 1, wherein the retargeting includes re-presenting the same item of invitational content to the device associated with the user on a channel associated with a content category for which the user is known to have previously converted other items of invitational content which is known from the analysis of the contextual-characteristics data.

5. The method of claim 1, wherein the retargeting comprises re-presenting the same item of invitational content to the device on a different website or application than a website or application previously used to present the same item of invitational content to the device, the different website or application being selected based on a determination that the different website or application has been previously accessed by the device with a greater frequency than the website or application previously used to present the same item of invitational content to the device .

6. The method of claim 1, wherein the contextual-characteristics data further includes data descriptive of a population of users' conversion habits across the network of application-delivery channels.

7. The method of claim 6, wherein the retargeting includes re-presenting the same item of invitational content on a channel for which it is known from the analysis of the contextual-characteristics data that other users are more likely to convert the same item of invitational content.

8. The method of claim 6, wherein the retargeting includes re-presenting the same item of invitational content on a channel for which it is known from the analysis of the contextual-characteristics data that the same item of invitational content is associated with a category of content and that category of content is associated with a higher conversion rate than the channel on which the same item of invitational content is being represented.

9. The method of claim 6, wherein the retargeting includes re-presenting the same item of invitational content on a channel for which it is known from the analysis of the contextual-characteristics data that the same item of invitational content, which is associated with a first category, is more likely to be converted because other items of invitational content that are associated with a second-related category have demonstrated higher conversion rates.

10. The method of claim 6, wherein the retargeting includes re-presenting the same item of invitational content during a period during which the invitational content is more likely to be converted as determined from the analysis of the contextual-characteristics data.

11. The method of claim 1, wherein the retargeting includes first presenting a different item of invitational content for which a conversion requires a lesser valued conversion, and second re-presenting the same invitational content after a conversion is recorded for the different item of invitational content.

12. The method of claim 11, wherein a conversion of the different item of invitational content requires a download of a lesser-version of an application and the same item of invitational content requires download of a full version of the application.

13. The method of claim 11, wherein the conversion of the different item of invitational content requires less user information than the same item of invitational content.

14. A non-transitory computer-readable medium having computer-readable code stored thereon for causing a computer to perform operations comprising:

identifying a device connecting to a network using non-persistent network sessions, wherein the device is associated with a user;

creating a user profile from data collected describing activities of the user on the device with respect to the user's interaction with invitational content previously presented to the user; and re-presenting the invitational content according to one or more modifications of a presentation of the invitational content, the one or more modifications having a higher likelihood of conversion as determined based on an analysis of the user profile, wherein the one or more modifications comprise a modified form of the invitational content on a different network channel, wherein the different network channel comprises a different website or a different digital media channel.

15. The non-transitory computer-readable medium of claim 14, wherein the one or more modifications comprise a different channel on which the user is known to have previously converted other items of invitational content.

16. The non-transitory computer-readable medium of claim 14, wherein the one or more modifications further comprise an added incentive to convert the invitational content, the added incentive comprising at least one of a discount and a bonus item.

17. The non-transitory computer-readable medium of claim 14, wherein the one or more modifications comprise a different channel that is associated with a content category for which the user is known to have previously converted other items of invitational content.

18. The non-transitory computer-readable medium of claim 14, wherein the one or more modifications comprise a different channel in which the user is known to frequently visit.

19. The non-transitory computer-readable medium of claim 14, wherein the re-presenting the invitational content according to the one or more modifications is further based on an analysis of other users' profiles.

20. The non-transitory computer-readable medium of claim 19, wherein the one or more modifications comprise a different period during which the invitational content is more likely to be converted as determined from the analysis of the other users' profiles.

21. A system comprising:

a processor; and a computer-readable storage medium having stored thereon instructions which, when executed by the processor, cause the processor to perform operations comprising:

identifying a device connecting to a network using non-persistent network sessions, wherein the device is associated with a user;

storing contextual-characteristics data descriptive of the user's interaction with items of invitational content; and retargeting a first item of invitational content previously presented to the user responsive to a failure by the user to convert the first item of invitational content, wherein the first item is retargeted according to one or more modifications comprising a modified form of the first item of invitational content delivered on a different network channel, wherein the different network channel comprises a different website or a different digital media channel.

22. The system of claim 21, wherein the retargeting includes first presenting an item of invitational content for which a conversion requires a lesser valued conversion, and second re-presenting a previously presented item of the invitational content after a conversion is recorded for the item of invitational content.

23. The system of claim 22, wherein a conversion of the item of invitational content requires a download of a lesser-version of an application and the previously presented item of invitational content requires download of a full version of the application.

24. The system of claim 22, wherein the conversion of the item of invitational content requires less user information than the previously presented item of invitational content.

25. The system of claim 21, wherein the retargeting includes re-presenting the invitational content to the user with an added incentive to convert the invitational content, the added incentive comprising at least one of a discount and a bonus item.

26. The method of claim 1, wherein the modification comprises presenting the first item in a different delivery channel from a first presentation of the first item, the different delivery channel having a higher response rate than a delivery channel associated with the first presentation.

* * * * *